United States Patent
Tatar et al.

(10) Patent No.: US 12,474,370 B2
(45) Date of Patent: Nov. 18, 2025

(54) DEVICE AND METHOD FOR COMPREHENSIVE CHARACTERIZATION, ANALYSIS, HETERO-GENITY AND PURITY QUANTIFICATION OF EXTRACELLULAR VESICLES

(71) Applicant: Lua Optomekatronik ARGE A.S., Istanbul (TR)

(72) Inventors: Tayfun Tatar, Istanbul (TR); Onur Samet Yildirim, Istanbul (TR)

(73) Assignee: Lua Optomekatronik ARGE A.S., Istanbul (TR)

( * ) Notice: Subject to any disclaimer, the term of this patent is extended or adjusted under 35 U.S.C. 154(b) by 766 days.

(21) Appl. No.: 17/887,532

(22) Filed: Aug. 15, 2022

(65) Prior Publication Data
US 2023/0003762 A1 Jan. 5, 2023

(30) Foreign Application Priority Data

| Jul. 5, 2021 | (TR) | 2021/010978 |
| Aug. 25, 2021 | (TR) | 2021/013430 |
| Jun. 7, 2022 | (TR) | 2022/009394 |

(51) Int. Cl.
*G01Q 30/02* (2010.01)
*G01N 21/65* (2006.01)
*G01N 33/68* (2006.01)
*G01Q 30/04* (2010.01)
(Continued)

(52) U.S. Cl.
CPC ......... *G01Q 30/02* (2013.01); *G01N 21/658* (2013.01); *G01N 33/6848* (2013.01); *G01Q 30/04* (2013.01); *G06T 7/0012* (2013.01); *G06T 7/60* (2013.01); *G06T 2207/10056* (2013.01); *G06T 2207/20081* (2013.01); *G06T 2207/30024* (2013.01)

(58) Field of Classification Search
None
See application file for complete search history.

(56) References Cited

PUBLICATIONS

Carolina Soekmadji, et al., The future of Extracellular Vesicles as Theranostics—an ISEV meeting report, Journal of Extracellular Vesicles, 2020, pp. 1-13, vol. 9, 1809766.
(Continued)

*Primary Examiner* — Xiaoyun R Xu
(74) *Attorney, Agent, or Firm* — Bayramoglu Law Offices

(57) ABSTRACT

An extracellular vesicle characterization and analysis device in terms of their size, phenotype, and cargo content is provided. A method performed with the device to quantify the heterogeneity of extracellular vesicle samples both in terms of size and cargo content and further quantify the purity of extracellular vesicles based on their phenotype and cargo content is further provided. The extracellular vesicle characterization and analysis device includes an atomic force microscope and confocal Raman spectrometer subsystems that will present the phenotypic characterization and cargo analysis of extracellular vesicles, respectively. By processing the topographic images obtained by atomic force microscopy with image processing methods and analyzing them, the dimensional heterogeneity of the extracellular vesicle samples can be quantified and information about their purity can be presented. The confocal Raman spectrometer applies the tip-enhanced Raman spectrum method, performs a heterogeneity quantification and provides data on the purity of the sample.

20 Claims, 5 Drawing Sheets

(51) Int. Cl.
  *G06T 7/00* (2017.01)
  *G06T 7/60* (2017.01)

(56) References Cited

PUBLICATIONS

Qin Zhang, et al., Supermeres are functional extracellular nanoparticles replete with disease biomarkers and therapeutic targets, Nature Cell Biology, 2021, pp. 1240-1254, vol. 23.

Laura M. Doyle, et al., Overview of Extracellular Vesicles, Their Origin, Composition, Purpose, and Methods for Exosome Isolation and Analysis, Cells, 2019, pp. 1-24, vol. 8, No. 727.

Jiaci Chen, et al., Review on Strategies and Technologies for Exosome Isolation and Purification, Frontiers in Bioengineering and Biotechnology, 2022, pp. 1-18, vol. 9, Article 811971.

Thomas A. Hartjes, et al., Extracellular Vesicle Quantification and Characterization: Common Methods and Emerging Approaches, Bioengineering, 2019, pp. 1-26, vol. 6, No. 7.

Juan Li, et al., Exosome detection via surface-enhanced Raman spectroscopy for cancer diagnosis, Acta Biomaterialia, 2022, pp. 1-14, vol. 144.

Eduard Willms, et al., Extracellular Vesicle Heterogeneity: Subpopulations, Isolation Techniques, and Diverse Functions in Cancer Progression, Frontiers in Immunology, 2018, pp. 1-17, vol. 9, Article 738.

DEVICE AND METHOD FOR COMPREHENSIVE CHARACTERIZATION, ANALYSIS, HETERO-GENITY AND PURITY QUANTIFICATION OF EXTRACELLULAR VESICLES

CROSS REFERENCE TO THE RELATED APPLICATIONS

This application is based upon and claims priority to Turkish Patent Application No: 2021/010978, filed on 5 Jul. 2021, Turkish Patent Application No: 2021/013430, filed on 25 Aug. 2021, and Turkish Patent Application No: 2022/009394, filed on 7 Jun. 2022, the entire contents of which are incorporated herein by reference.

TECHNICAL FIELD

The present invention relates to the building of a device for multi-perspective characterization and analysis of single extracellular vesicles characterization heterogeneity and development of a method for the quantification of purity and heterogeneity of individual extracellular vesicles.

BACKGROUND

Extracellular vesicles (EV); are the particles released into the extracellular space by cells which are surrounded by a membrane consisting of a double layer of lipids. They can be subdivided into exosomes, microvesicles, apoptotic bodies depending on their origin[1]. Apart from these well-classified sub-types, recent studies also defined novel sub-types called exomeres and supermeres based on compositional uniqueness, of which biogenesis still need further investigation[2].

[1] C. Soekmadji, B. Li, Y. Huang, H. Wang, T. An, C. Liu, W. Pan, J. Chen, L. Cheung, J. M. Falcon-Perez, Y. S. Gho, H. B. Holthofer, M. T. Le, A. Marcilla, L. O'Driscoll, F. Shekari, T. L. Shen, A. C. Torrecilhas, X. Yan, F. Yang, H. Yin, Y. Xiao, Z. Zhao, X. Zou, Q. Wang, and L. Zheng, "The future of extracellular vesicles as theranostics—an ISEV meeting report," *Journal of Extracellular Vesicles*, vol. 9, no. 1, p. 1809766, 2020.

[2] Q. Zhang, D. K. Jeppesen, J. N. Higginbotham, R. Graves-Deal, V. Q. Trinh, M. A. Ramirez, Y. Sohn, A. C. Neininger, N. Taneja, E. T. McKinley, H. Niitsu, Z. Cao, R. Evans, S. E. Glass, K. C. Ray, W. H. Fissell, S. Hill, K. L. Rose, W. J. Huh, M. K. Washington, G. D. Ayers, D. T. Burnette, S. Sharma, L. H. Rome, J. L. Franklin, Y. A. Lee, Q. Liu, and R. J. Coffey, "Supermeres are functional extracellular nanoparticles replete with disease biomarkers and therapeutic targets," *Nature Cell Biology*, vol. 23, no. 12, pp. 1240-1254, 2021.

Exosomes, one of the most widely studied subgroups of extracellular vesicles, have a diameter of about 30-150 nm[3]. They are formed by the endosomal route are released into the extracellular space by fusion of late multivesicular bodies (MVBs). Depending on the way of formation, they carry harboring ESCRT proteins (Alix, TSG101, HSC70, HSP90β) densely-packed tetraspanin varieties (CD9, CD63, CD81) on their surfaces and in addition, a variety of proteins, lipids and nucleic acids that vary based on the source cells and their functions. Detection of exosomes is possible in any body fluid, including blood, urine, semen, cerebrospinal fluid and saliva. Exosomes, which can be uptaken by adjacent or distant recipient cells, determine the fate of recipient cells depending on their molecular content when they enter the extracellular space. This leads to the conclusion that exosomes are significant in understanding intercellular communication. As a consequence of these roles, exosomes stand out as a suitable candidate for both non-invasive liquid biopsy techniques and drug, gene, or enzyme delivery techniques with high cell selectivity and the ability to escape triggering immune responses.

[3] L. Doyle and M. Wang, "Overview of extracellular vesicles, their origin, composition, purpose, and methods for exosome isolation and analysis," *Cells*, vol. 8, no. 7, p. 727, 2019.

Unlike exosomes, microvesicles are released into the extracellular space by directly budding from the cell membrane. Their sizes vary between 100-1000 nm. Depending upon their cellular formation routes, they commonly contain plasma membrane-associated proteins, cytosolic proteins, tetraspanins, heat shock proteins and active molecules that vary depending on their origin. Similar to exosomes, microvesicles also serve in the transport of active molecules between cells by taking part in intercellular communication. These roles are evident with their increasing numbers in various pathologic conditions. Microvesicles, with their functionalities in intercellular communication, also take a direct role in the course of the disease. Therefore, microvesicles have also become one focal point of research for the development of innovative diagnostic and treatment methods for a variety disease groups.

Apoptotic bodies are a less studied subgroup compared to the other two subgroups of extracellular vesicles. They are vesicles with dimensions between 50 and 5000 nm that are circulated by dying cells, which naturally limits their functionality. They may contain organelles, chromatin and glycosylated proteins. Unlike exosomes and microvesicles, they are separated from the plasma membrane of the cell due to the increase in hydrostatic pressure.

Exomeres are a subgroup of extracellular vesicles that have been discovered quite recently using the asymmetric flow field fractionation (AF4) technique. Research studies are continued to obtain detailed information about exomeres that differ from other subgroups with their molecular structures and sizes (~35 nm). In the years following the discovery of the exomeres, supermeres were defined as particles that differ in their absorption mechanism into the cell. Although they have similar dimensions with exomeres, they differ in morphology and cargo content. Detailed information on their origin has not been obtained yet.

The breadth of potential applications has led to a rapid acceleration of research on extracellular vesicles in recent years. In this direction, innovative approaches have been developed both for the separation of extracellular vesicles from the body fluid samples to be obtained, and for the characterization and analysis process following the separation process.

For enriching the extracellular vesicles from the body fluid to be studied, there are a bunch of different strategies. While the gold standard method is ultracentrifugation due to its widespread accessibility, the technique suffers from downsides such as low yield and purity, damaging exosomes, and difficulty of operation[4]. Even though it can be replaced with methods such as density gradient centrifugation, ultrafiltration, size exclusion chromatography, immunoaffinity, and polymer precipitation all have their pros and cons. In addition, microfluidics-based methods also attracted interest in the recent years as a result of their low-cost as well as the ability to be combined with characterization and analysis methods. While the efforts towards standardizing the exosome isolation procedures are still ongoing, the critical question in the usefulness of the developed isolation method is the purity it can achieve. Therefore, purity assessment of extracellular vesicles is a critical question.

[4] J. Chen, P. Li, T. Zhang, Z. Xu, X. Huang, R. Wang, and L. Du, "Review on strategies and technologies for exosome isolation and purification," *Frontiers in Bioengineering and Biotechnology*, vol. 9, 2022.

The methods employed for the characterization and analysis of isolated extracellular vesicles can be divided into three different perspectives as phenotype, size-concentration and cargo analysis. For phenotyping of extracellular vesicles, atomic force microscopy as well as different kinds of electron microscopy methods are employed. These high-resolution imaging methods can further provide information on the size of extracellular vesicles when combined with image analysis techniques. The methods devoted to directly perform the size and concentration analysis of extracellular vesicles can be listed as tunable resistive pulse sensing (TRPS), dynamic light scattering (DLS), and nanoparticle tracking analysis (NTA)[5]. Cargo (molecular content) analysis of extracellular vesicles, on the other hand, can be performed by wet lab techniques (ELISA, PCR), low-efficiency methods such as Western blot, labeling-limited techniques such as flow cytometry and fluorescence microscopy, or by high-cost methods such as mass spectrometry that require technical expertise in addition to its high sample consumption. Moreover, vibrational spectroscopy techniques such as Raman spectroscopy are other methods which are recently gaining popularity for cargo analysis of extracellular vesicles[6].

[5] T. Hartjes, S. Mytnyk, G. Jenster, V. van Steijn, and M. van Royen, "Extracellular vesicle quantification and characterization: Common methods and emerging approaches," *Bioengineering*, vol. 6, no. 1, p. 7, 2019.

[6] J. Li, Y. Li, P. Li, Y. Zhang, L. Du, Y. Wang, C. Zhang, and C. Wang, "Exosome detection via surface-enhanced Raman spectroscopy for cancer diagnosis," *Acta Biomaterialia*, vol. 144, pp. 1-14, 2022.

Extracellular vesicles are structures with high heterogeneity in both size and cargo content[7]. Although their heterogeneity in dimensional terms can be quantified with existing dimensional analysis methods, the fact that all of the existing methods are bulk analysis methods undermines the consistency of this quantification. In addition, the inability to quantitatively express the existing heterogeneity in cargo contents is the most important obstacle for maturation of research studies on extracellular vesicles for potential application areas. Existing cargo analysis methods listed above cannot meet the need for detailed heterogeneity expression as they target the bulk (collective) analysis of extracellular vesicles. In order to overcome this problem, optical tweezers have been used in combination with Raman spectroscopy in various research studies, however, while these studies achieved successful results, they could not overcome the long measurement time problem required to overcome the low signal problem of Raman spectroscopy. In addition to this, the verification that only a single extracellular vesicle is measured in optical traps created by optical tweezers in the abovementioned studies was carried out through indirect methods such as adequate dilution of the sample or aided by the intensity of Rayleigh scattering. Therefore, there is a lack of a method which targets the analysis of single vesicle cargo to perform the heterogeneity analysis of extracellular vesicles and accurately verifies the single vesicle measurement while doing this. In addition to all these, there is no method that analyzes the dimensional heterogeneity of extracellular vesicles in combination with the heterogeneity of cargo content.

[7] E. Willms, C. Cabañas, I. Mager, M. J. Wood, and P. Vader, "Extracellular vesicle heterogeneity: Subpopulations, isolation techniques, and diverse functions in cancer progression," *Frontiers in Immunology* vol. 9, 2018.

SUMMARY

The aim of present invention is to build a device for multi-perspective characterization and analysis of single extracellular vesicles and to develop a method for heterogeneity and purity quantification of extracellular vesicles, which is one of the focal points of the ongoing studies for liquid biopsy-based early diagnosis methods or innovative therapeutics via drug, gene or enzyme carrier.

Another aim of the present invention is to build a device for multi-perspective characterization and analysis of single extracellular vesicles where the multi-perspective characterization and analysis covers sizing, phenotyping, and molecular profiling of extracellular vesicles.

Another aim of the present invention is to build a device for multi-perspective characterization and analysis of single extracellular vesicles where the phenotyping of extracellular vesicles is performed through atomic force microscopy (AFM) technique and topographic images of extracellular vesicles are obtained satisfying the requirements of high resolution (~1 nm) and no sample dehydration.

Another aim of the present invention is to build a device for multi-perspective characterization and analysis of single extracellular vesicles where image processing methods are employed on topographic images of extracellular vesicles for extracellular vesicle sizing.

Another aim of the present invention is to build a device for multi-perspective characterization and analysis of single extracellular vesicles where the cargo analysis of extracellular vesicles is performed by tip enhanced Raman spectroscopy by employing the same tip integrated within the AFM system during Raman spectroscopy measurement.

Another aim of the invention is to build a device for multi-perspective characterization and analysis of single extracellular vesicles where the extracellular vesicles to be analyzed for homogeneity and purity are exosomes.

Another aim of the invention is to build a device for multi-perspective characterization and analysis of extracellular vesicles in order to perform homogeneity and purity quantification of extracellular vesicle groups other than exosomes.

Another aim of the present invention is to develop a method for heterogeneity and purity quantification of extracellular vesicles exploiting the size, phenotype, and cargo-based characterization and analysis results at single extracellular vesicle level.

Another aim of the invention is to develop a method for heterogeneity and purity quantification of extracellular vesicles in which the extracellular vesicles to be analyzed for homogeneity and purity are exosomes.

Another aim of the invention is to develop a method for heterogeneity and purity quantification of extracellular vesicles in order to perform homogeneity and purity quantification of extracellular vesicle groups other than exosomes.

Another aim of the invention is to develop a method for heterogeneity and purity quantification of extracellular vesicles, which includes a dimensional heterogeneity quantification that combines software and hardware techniques.

Another aim of the invention is to develop a method for heterogeneity and purity quantification of extracellular vesicles in which the dimensional part of the homogeneity quantification can be performed over a size distribution profile after extracting the dimensions of single extracellular vesicles through image processing techniques applied on topographic extracellular vesicle images.

Another aim of the invention is to develop a method for heterogeneity and purity quantification of extracellular vesicles in which AFM topographic images can be combined with machine learning or artificial intelligence techniques for detecting impurities inside the extracellular vesicle sample for sample purity quantification.

Another aim of the invention is to develop a method for heterogeneity and purity quantification of extracellular vesicles, in which Raman spectrum of single extracellular vesicles in the sample will be obtained through the detection of the extracellular vesicles in the topographic image of the sample with software tools and realization of Raman spectroscopy method enhanced with tip AFM tip.

Another aim of the invention is to develop a method for heterogeneity and purity quantification of extracellular vesicles, in which the confirmation that the obtained Raman spectrum is taken from a single source of extracellular vesicle can be made clearly owing to the AFM topographic image, and then the obtained Raman spectrum will be used to deter-mine the heterogeneity of extracellular vesicles in terms of cargo contents.

Another aim of the invention is to develop a method for heterogeneity and purity quantification of extracellular vesicles, in which multivariate analysis techniques or protein/lipid, nucleic acid/lipid ratios that can be read through the intensity of spectroscopic bands can be used to analyze Raman spectrum and quantify extracellular vesicle heterogeneity.

Another aim of the invention is to develop a method for heterogeneity and purity quantification of extracellular vesicles, in which analysis of Raman spectra using protein/lipid, nucleic acid/lipid ratios that can be read through the intensity of spectroscopic bands can be used to quantify the purity of extracellular vesicles.

BRIEF DESCRIPTION OF THE DRAWINGS

The detailed diagrams of the multi-perspective characterization and analysis device for single extracellular vesicles as well as heterogeneity and purity quantification method for these extracellular vesicles to be performed with the invention are as follows.

Figure 1:
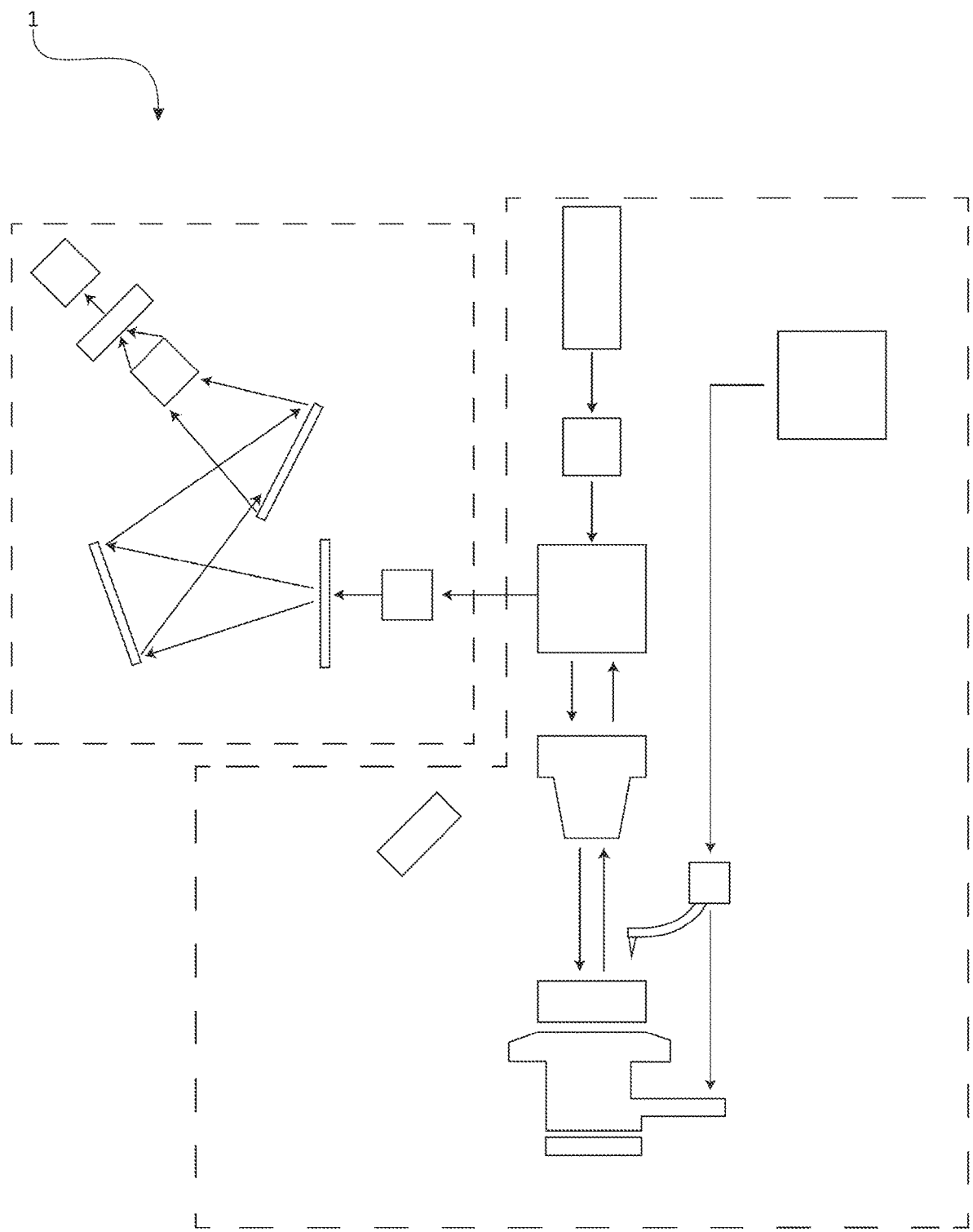
FIG. 1 is the schematic view of the multi-perspective characterization and analysis device for single extracellular vesicles according to the invention.
Figure 2:
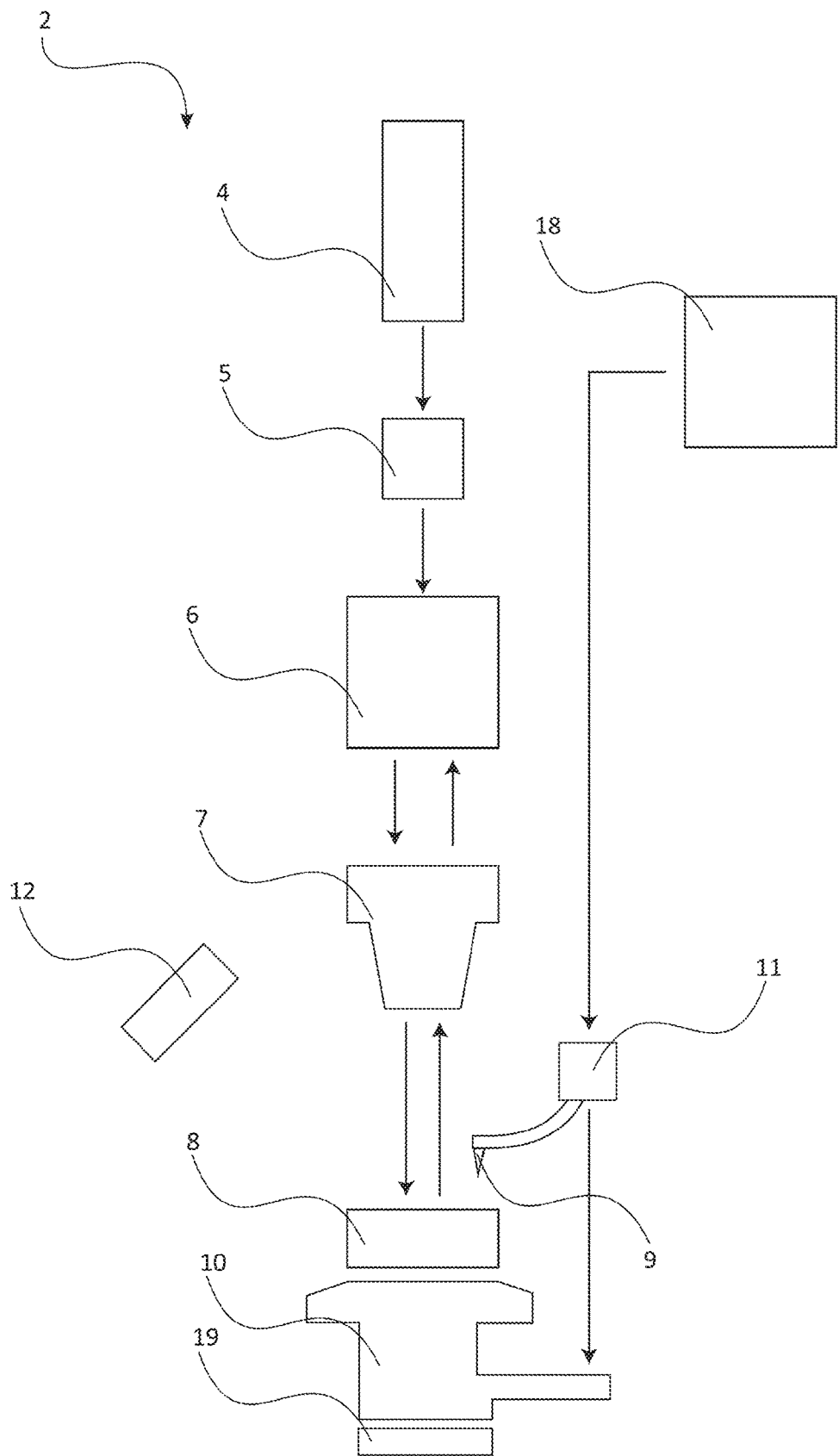
FIG. 2 is a schematic view of the atomic force microscope of the multi-perspective characterization and analysis device for single extracellular vesicles according to the invention.
Figure 3:
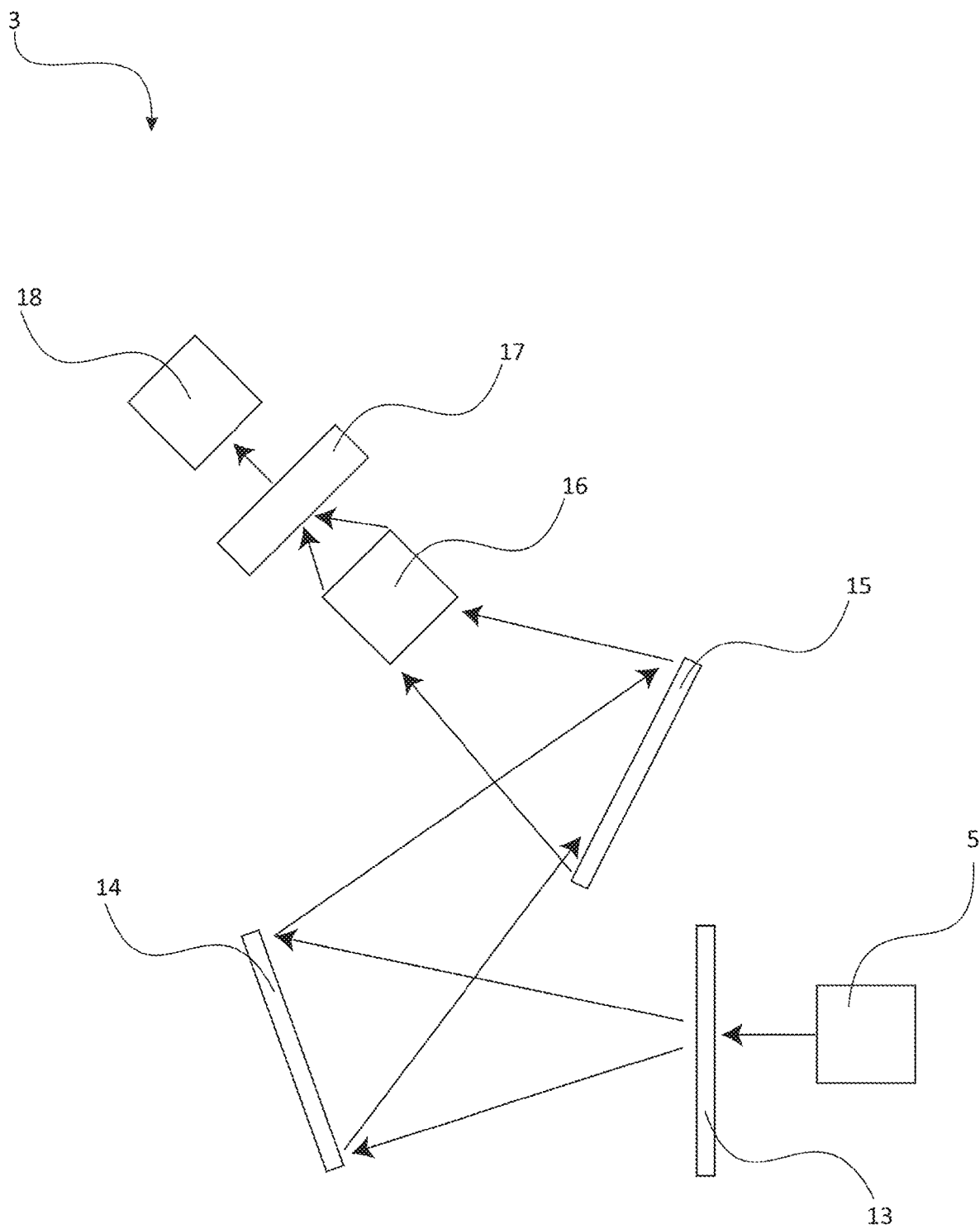
FIG. 3 is a schematic view of the confocal Raman spectrometer of the multi-perspective characterization and analysis device for single extracellular vesicles according to the invention.
Figure 4:
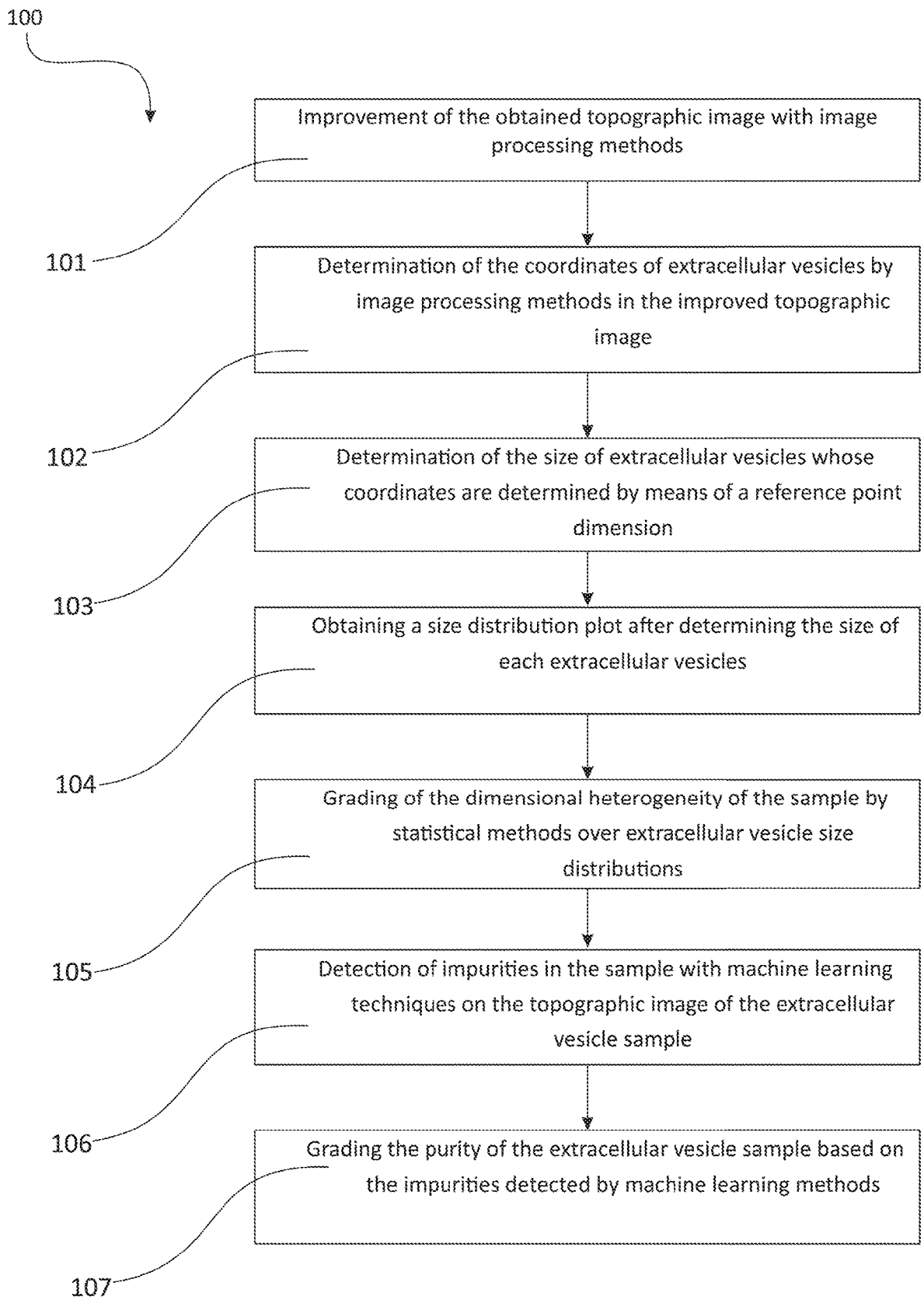
FIG. 4 is the flow algorithm of dimensional heterogeneity and purity quantification in terms of size and phenotype of extracellular vesicle samples according to the invention.
Figure 5:
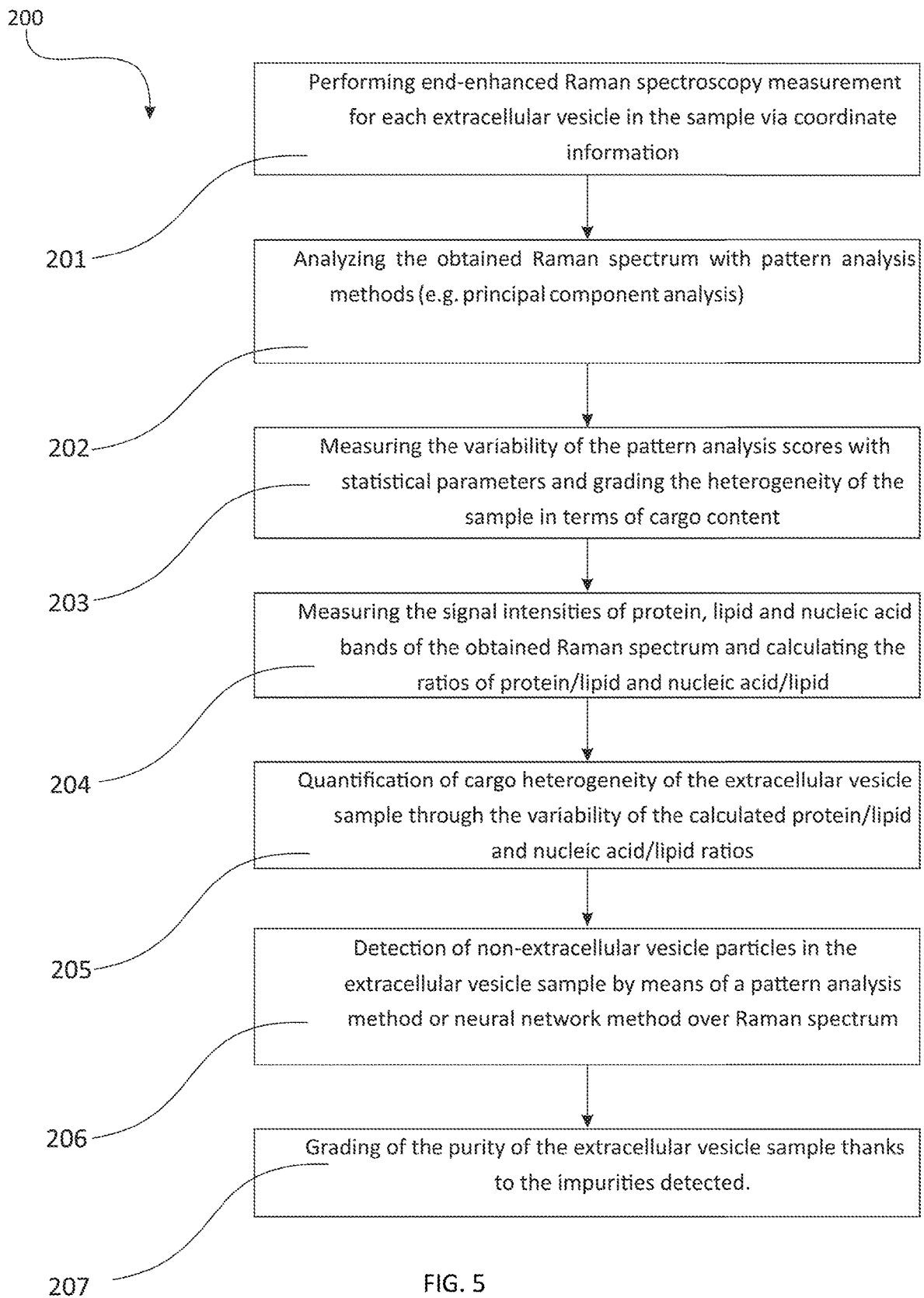
FIG. 5 is the flow algorithm of heterogeneity and purity quantification in terms of cargo content of extracellular vesicle samples according to the invention.

The elements shown in the figures are numbered and their equivalents are below.

1. Extracellular vesicle characterization and analysis system
2. Atomic force microscope (AFM)
3. Confocal Raman spectrometer
4. Laser
5. Filter
6. Beam splitter
7. Objective
8. Sample
9. Tip
10. Stage
11. Motor
12. Photodiode
13. Slit
14. Mirror
15. Grating
16. Lens
17. Sensor
18. Computer
19. Platform

DETAILED DESCRIPTION OF THE EMBODIMENTS

The invention consists of an extracellular vesicle characterization and system (1) for multi-perspective characterization and analysis of extracellular vesicles at single vesicle level in terms of size, phenotype, and cargo content as well as a method to be performed by this device to quantify the heterogeneity and purity of extracellular vesicle. It consists of the subsystems of an atomic force microscope (2) and confocal Raman spectrometer (3), which will provide phenotypic characterization and cargo analysis of extracellular vesicles. Phenotypic characterization can be further extended to size-based characterization when combined with software methods such as image processing.

The first step of extracellular vesicle characterization and analysis procedure is to obtain a topographic image of the extracellular vesicle sample (8) by the atomic force microscope (2). For this purpose, a laser (4) in the system focuses on a tip (9) through an objective (7). The light intensity reflected from this tip (7) is followed by a photodiode (12) with four quadrants, in other words, four active optical areas, which acts as a sensor. The tip (7) is moved over the surface of the extracellular vesicle sample (8) by moving the stage (10) with micron precision in two axes in the horizontal plane by means of a motor (11). Meanwhile, since the intensity of the light reflected on the photodiode (12) through the tip (9) changes depending on the surface topography, the recorded light intensity data can be translated into a topographic image of the sample (8) by a computer (18) system. In order to confirm the sensitivity of the process to vibrations, the platform (19) ensures that the stage (10) remains stable by absorbing environmental vibrations during this process.

The atomic force microscope (2) subsystem provides a topographic image of extracellular vesicles to be examined phenotypically. The topographic image includes an image of the extracellular vesicles with a resolution of ~1 nm. Since this resolution limit is much lower compared to the size of extracellular vesicles (roughly >30 nm), it allows a high-quality observation of extracellular vesicle phenotypes.

Size analysis of extracellular vesicles is commonly performed by different optical methods. However, these methods increase the complexity of the system as they require the inclusion of a new laser (4) and additionally new optical components in the system if they are needed to be integrated with other subsystems. On the other hand, provided that high-resolution images of extracellular vesicles are obtained, the size information can be gathered by employing image processing techniques on these images. Thanks to its high resolution, the atomic force microscope (2) can image extracellular vesicle particles ranging in size from 30 nm to micron levels with high resolution. This way, it is possible to use the images obtained with the atomic force microscope (2) for particle size analysis.

By the help of the image processing techniques to be used on the computer (18) within this platform, the coordinates of circular shaped extracellular vesicles on the stage (10) will be determined by methods such as corner detection or circle detection, and their dimensions will be measured using the known angle of view as a reference. After measuring the size of each extracellular vesicle, the obtained size information will be transferred to a size distribution plot. Afterwards, the dimensional homogeneity of the sample (8) will be calculated quantitatively by using statistical parameters such as mode, median, standard deviation, range, and variance on this size distribution plot.

Apart from phenotyping and sizing of the extracellular vesicle sample (8), which also includes the size-based heterogeneity quantification, the topographic image can also be facilitated for purity quantification when combined with machine learning techniques. By resorting to such techniques on topographic images, it is possible to extract various contaminating components (e.g., lipoproteins) contained in the sample (8), which are within the size range of the extracellular vesicles but whose phenotypic differences are discernible. As a distinguishing feature for this purpose, it can be used, for example, that the lipoproteins contain a monolayer lipid membrane while the extracellular vesicles are surrounded by a lipid bilayer. Detection of non-extracellular vesicular particles in sample (8) this way can serve to grade the purity of sample (8).

After obtaining the topographic image of the extracellular vesicle sample (8), the confocal Raman spectrometer (3) subsystem is used to characterize and analyze the extracellular vesicle sample (8) in terms of cargo content. For Raman spectrum measurement, a laser (4) integrated into the system is passed through a narrowband pass filter (5) that only allows the excitation wavelength to enter the system. The filtered laser beam reaches a beam splitter (6) and undergoes a 50:50 separation. After separation, half of the beam is transmitted to a microscopic objective (7), while the other half is transferred to an absorbing surface and removed from the system. This objective (7), which has a high numerical aperture, focuses the laser beam on the sample (8). In the meantime, the sample (8), which scatters the focused beam, can perform this scattering in two ways. The components that are elastically scattered without interacting with the sample (8) surface and therefore without undergoing an energy change are called Rayleigh scattering. Since Rayleigh scattering does not interact with the sample, it does not contain any information about its molecular content. The valuable portion of the scattering is called Raman scattering, which is formed of inelastically scattered light from the surface by interacting with it. The scattering of this sample (8) after stimulation is collected by the same objective (7) and the half of the collected light signal is transferred to the confocal Raman spectrometer (3) by the beam splitter (6) by undergoing a 50:50 separation. A sharp-edged long-pass filter (5) located at the input of the confocal Raman spectrometer (3) filters out Rayleigh scattering, which does not provide information about the chemical structure of the sample, but still allows the Raman signal intended for measurement. The Raman scattering, separated from the Rayleigh scattering, is delivered to an entrance slit (13). This slit (13) allows only a portion of the Raman radiation to enter the spectrometer chamber to increase the resolution of the measurement to be performed. Raman radiation, which is allowed to enter this chamber, is collimated by a mirror (14) onto a reflective grating (15). By reflecting each wavelength at a different angle, the grating (15) separates the collimated radiation into wavelengths and transfers it onto a camera lens (16). The lens (16) focuses the radiation separated into wavelengths onto a sensor (17). The radiations of different wavelengths falling on the sensor (17) are read by the computer (18) and converted into spectrum information.

By the help of the Raman spectra obtained through the confocal Raman spectrometer (3) subsystem, the molecular fingerprint of the extracellular vesicle sample (8) can be obtained. However, the main practical problem of Raman spectroscopy is that a very small portion of the laser beam that the sample (8) is exposed to undergoes inelastic scattering, hence a wavelength change, by interacting with the molecular surface of the sample (8). This implies the signal level is extremely low under normal circumstances and the measurement requires long exposure times. In order to overcome this problem, the tip (9) inside the atomic force microscope (2) will be employed for applying tip-enhanced Raman spectroscopy. Accordingly, the tip (9) to be used will consist of a plasmonic material such as gold, silver or copper. In such a way, the tip can increase the Raman signal in its close vicinity by an order of $10^{11}$, owing to the intense magnetic fields formed in the metal nano-cavities. With the application of tip enhancement, long measurement times will be avoided. Furthermore, since the tip enhancement is available only in the close proximity of the sharp tip (9), the Raman measurement can be performed at the single vesicle level. For the detection of the vesicle positions, the coordinates gathered from the topographic image will be employed.

Raman spectrum of single extracellular vesicles obtained by this procedure can be used to detect heterogeneity and purity of cargo contents. Unlike the methods previously mentioned in the literature, this method allows to be sure that the obtained spectrum belongs to a single extracellular vesicle, since the measurement point is selected directly on a topographic image. One way of quantifying the heterogeneity of extracellular vesicle cargo content is to exploit multivariate analysis methods such as principal component analysis, linear discriminant analysis. These methods can perform pattern analysis of Raman spectrum and quantify vesicle-to-vesicle differentiation of the pattern, which can act as a parameter for cargo-content heterogeneity. In the same way, such pattern analysis can distinguish between the Raman spectra of extracellular vesicles and those of impurities. Hence, the aforementioned methods can also quantify the purity of the extracellular vesicle sample (8).

Moreover, spectroscopic protein/lipid and nucleic acid/lipid ratios can also be determined by performing nucleic acid band (e.g. 720-800 $cm^{-1}$) protein band (e.g. 1600-1690 $cm^{-1}$) and lipid band (e.g. 2750-3040 $cm^{-1}$) intensity measurements over the Raman spectrum. Inter-measurement variation between these ratios is another tool for understanding extracellular vesicle sample (8) heterogeneity.

The extracellular vesicle characterization and analysis system (1) described until here can be summarized as a workflow by the following steps, (100) Obtaining the topographic image of the extracellular vesicle sample placed in the sample holder compartment by means of atomic force microscopy (200) Performing cargo analysis of the extracellular vesicle sample placed in the sample holder chamber by tip-enhanced Raman spectroscopy.

However, (100) the step of obtaining the topographic image of the extracellular vesicle sample placed in the sample holder compartment by atomic force microscope consists of the following sub-steps, (101) Improvement of the obtained topographic image with image processing methods (102) Determination of the coordinates of extracellular vesicles by image processing methods in the improved topographic image (103) Determination of the size of extracellular vesicles whose coordinates are determined by means of a reference point dimension
(104) Obtaining a size distribution plot after determining the size of each extracellular vesicles
(105) Grading of the dimensional heterogeneity of the sample by statistical methods over extracellular vesicle size distributions
(106) Detection of impurities in the sample with machine learning techniques on the topographic image of the extracellular vesicle sample
(107) Grading the purity of the extracellular vesicle sample based on the impurities detected by machine learning methods In addition, (200) the step of performing the cargo analysis of the extracellular vesicle sample placed in the sample holder compartment with end-enhanced Raman spectroscopy includes the following sub-steps,
(201) Performing end-enhanced Raman spectroscopy measurement for each extracellular vesicle in the sample via coordinate information
(202) Analyzing the obtained Raman spectrum with pattern analysis methods (e.g. principal component analysis)
(203) Measuring the variability of the pattern analysis scores with statistical parameters and grading the heterogeneity of the sample in terms of cargo content
(204) Measuring the signal intensities of protein, lipid and nucleic acid bands of the obtained Raman spectrum and calculating the ratios of protein/lipid and nucleic acid/lipid
(205) Quantification of cargo heterogeneity of the extracellular vesicle sample through the variability of the calculated protein/lipid and nucleic acid/lipid ratios
(206) Detection of non-extracellular vesicle particles in the extracellular vesicle sample by means of a pattern analysis method or neural network method over Raman spectrum
(207) Grading of the purity of the extracellular vesicle sample thanks to the impurities detected.

The invention claimed is:

1. A method for quantitatively measuring a heterogeneity and a purity of extracellular vesicles from a multiple perspective using a device for a multi-perspective characterization and analysis of the extracellular vesicles, through a system incorporating subsystems for the characterization and analysis of the extracellular vesicles circulating freely in body fluids by multiple methods, comprising:
characterizing extracellular vesicle phenotype with an atomic force microscopy,
measuring a size of the extracellular vesicles and detecting topographic coordinates of the extracellular vesicles by combining high-resolution topographic images obtained by the atomic force microscope with software methods,
measuring a dimensional heterogeneity by translating size measurements of the extracellular vesicles to a size distribution plot and integrating statistical methods for a size-based heterogeneity quantification,
detecting impurities within samples of the extracellular vesicles based on phenotypical differences of the samples using a machine learning and/or artificial intelligence algorithms
quantifying a cargo content heterogeneity by performing and comparing a single vesicle level cargo analysis of the extracellular vesicles using a tip-enhanced Raman spectroscopy technique in coordination with known topographic coordinates of the vesicular particles,
detecting the impurities inside the samples of the extracellular vesicle based on molecular structures of the samples during the single vesicle level cargo analysis.

2. The method according to claim 1, wherein the samples of the extracellular vesicles to be characterized and analyzed comprise exosomes.

3. The method according to claim 1, wherein the samples of the extracellular vesicles to be characterized and analyzed comprise microvesicles.

4. The method according to claim 1, wherein the samples of the extracellular vesicles to be characterized and analyzed comprise apoptotic bodies.

5. The method according to claim 1, wherein the samples of the extracellular vesicles to be characterized and analyzed comprise supermeres or exomeres.

6. The method according to claim 1, wherein the samples of the extracellular vesicles to be characterized and analyzed comprise a group of extracellular vesicles other than exosomes, microvesicles, apoptotic bodies, and supermeres or exomeres.

7. The method according to claim 1, wherein a tip used for the atomic force microscopy is coated with a plasmonic material, and the plasmonic material comprises gold or silver.

8. The method according to claim 7, wherein high-resolution topographic images of hydrodynamic dimensions of the extracellular vesicles are obtained owing to a resolution capability of approximately 1 nm and no need for a dehydration.

9. The method according to claim 1, wherein the topographic coordinates of the extracellular vesicles immobile in the samples are determined by image processing methods performed on the high-resolution topographic images in a computer environment.

10. The method according to claim 1, further comprising: determining diameters of the extracellular vesicles immobile in the samples by a reference point, based on image processing methods performed on the high-resolution topographic images in a computer environment.

11. The method according to claim 1, further comprising: transforming the size of the extracellular vesicles measured by image processing techniques in a computer environment into the size distribution plot.

12. The method according to claim 1, wherein, after obtaining a size distribution graph by measuring the size of the extracellular vesicles in a computer environment, the dimensional heterogeneity is quantified by measuring statistical parameters comprising mode, median, standard deviation, range, and variance.

13. The method according to claim 1, wherein a lipid bilayer surrounding the extracellular vesicles is used as a distinctive pattern recognition feature during a differentiation of non-extracellular vesicle particles in the high-resolution topographic images obtained by the machine learning and/or artificial intelligence techniques.

14. The method according to claim 1, wherein the single vesicle level cargo analysis of the extracellular vesicles is performed by a Raman spectrum measurement by a confocal Raman spectrometer within the subsystems.

15. The method according to claim 14, wherein the Raman spectrum measurement is performed in a single vesicle level by focusing a laser on a single extracellular vesicle via a moving stage, using previously obtained topographic coordinate information of the extracellular vesicles fixed on a surface of the samples.

16. The method according to claim 15, wherein by keeping a tip of the atomic force microscopy coated with a plasmonic material at a point where the laser is focused, thanks to the moving stage, a Raman spectroscopy method is applied in an enhanced way at the tip and thus a measurement time is shortened.

17. The method according to claim 1, wherein the purity of the samples of the extracellular vesicles is quantified by determining Raman spectra, each of the Raman spectra belongs to a single particle and is stored in a computer environment and does not belong to the extracellular vesicles.

18. The method according to claim 1, wherein the cargo content heterogeneity of the samples of the extracellular vesicles is quantified by pattern analysis methods comprising a multivariate analysis and/or neural network methods performed on Raman spectra of single vesicles.

19. The method according to claim 1, wherein intensities of a protein, a nucleic acid and lipid bands of Raman spectra each stored in a computer environment and belonging to a single extracellular vesicle are calculated, and a protein/lipid ratio and a nucleic acid/lipid ratio is determined.

20. The method according to claim 1, wherein the cargo content heterogeneity of the samples of the extracellular vesicles is quantified by measuring statistical parameters comprising mode, median, variance, range and standard deviation of a protein/lipid ratio and a nucleic acid/lipid ratio calculated based on a large number of Raman spectra each stored in a computer environment and belonging to a single extracellular vesicle.

* * * * *